(12) United States Patent
Hagist et al.

(10) Patent No.: US 7,909,587 B2
(45) Date of Patent: Mar. 22, 2011

(54) DEVICE FOR RETAINING A FUEL PUMP IN A FUEL CONTAINER

(75) Inventors: Dieter Hagist, Lahnstein (DE); Matthias Kadler, Ruesselsheim (DE)

(73) Assignee: Siemens Aktiengesellschaft, München (DE)

( * ) Notice: Subject to any disclaimer, the term of this patent is extended or adjusted under 35 U.S.C. 154(b) by 378 days.

(21) Appl. No.: 10/581,325

(22) PCT Filed: Nov. 3, 2004

(86) PCT No.: PCT/EP2004/052779
§ 371 (c)(1), (2), (4) Date: Jun. 1, 2006

(87) PCT Pub. No.: WO2005/053987
PCT Pub. Date: Jun. 16, 2005

(65) Prior Publication Data
US 2007/0116581 A1 May 24, 2007

(30) Foreign Application Priority Data
Dec. 1, 2003 (DE) .................... 103 56 061

(51) Int. Cl.
F04B 17/00 (2006.01)
F04B 35/00 (2006.01)
(52) U.S. Cl. ........................................ 417/360
(58) Field of Classification Search .......... 417/360, 417/363, 423.3, 423.15, 424.1; 248/311.2, 248/314; 137/565.24; 123/509
See application file for complete search history.

(56) References Cited

U.S. PATENT DOCUMENTS

| | | | | | |
|---|---|---|---|---|---|
| 4,590,964 | A | * | 5/1986 | Beardmore | 137/565.24 |
| 4,591,319 | A | * | 5/1986 | Takahashi et al. | 417/360 |
| 4,636,673 | A | * | 1/1987 | McDonald | 310/91 |
| 4,694,857 | A | * | 9/1987 | Harris | 137/565.24 |
| 4,716,931 | A | * | 1/1988 | Shibamoto | 137/558 |
| 4,768,925 | A | * | 9/1988 | Geupel | 415/213.1 |
| 4,790,185 | A | * | 12/1988 | Fedelem et al. | 73/317 |
| 4,964,787 | A | * | 10/1990 | Hoover | 417/363 |
| 5,165,867 | A | | 11/1992 | Dockery | |
| 5,427,074 | A | | 6/1995 | Tuckey | |
| 6,478,014 | B1 | | 11/2002 | Kohlhaas | |
| 6,854,451 | B2 | * | 2/2005 | Ebihara et al. | 123/509 |

(Continued)

FOREIGN PATENT DOCUMENTS

DE 4336574 A1 5/1995

(Continued)

OTHER PUBLICATIONS

Translation of DE19534411, Kurt Frank, Mar. 20, 1997.*

Primary Examiner — Devon C Kramer
Assistant Examiner — Amene S Bayou
(74) Attorney, Agent, or Firm — Cohen Pontani Lieberman & Pavane LLP

(57) ABSTRACT

A device used to retain a fuel pump in a fuel container of a motor vehicle, which includes a pump holder that is made entirely of plastic by injection moulding. Retaining devices, which is used to join the pump holder to the fuel pump and to a baffle pot, are connected to each other by arms that are oriented away from each other. The arms, which are orientated away from each other, form a cardanic frame that dampens vibrations from the fuel pump.

18 Claims, 2 Drawing Sheets

U.S. PATENT DOCUMENTS 7,252,075 B2  8/2007  Firtion et al.

FOREIGN PATENT DOCUMENTS

| DE | 19524034 A1 | | 1/1997 |
| DE | 19534411 | * | 3/1997 |
| DE | 19534411 A1 | | 3/1997 |
| DE | 100 55 344 A1 | | 5/2001 |
| DE | 69612351 T2 | | 7/2001 |
| EP | 0 558 110 A1 | | 9/1993 |
| EP | 0773362 A1 | | 5/1997 |
| EP | 0 903 255 | | 3/1999 |
| JP | 7-310616 | | 11/1995 |
| WO | WO 02/40302 | | 5/2002 |

* cited by examiner

DEVICE FOR RETAINING A FUEL PUMP IN A FUEL CONTAINER

FIELD OF THE INVENTION

The invention relates to a device for retaining a fuel pump in a fuel container of a motor vehicle, with a pump holder, with first retaining means of the pump holder, provided for supporting on a fixed component, in particular a baffle pot, and with second retaining means of the pump holder, provided for supporting the fuel pump, and with a damping device connecting the first and the second retaining means to one another, the retaining means being manufactured from plastic.

DISCUSSION OF THE PRIOR ART

In motor vehicles nowadays, a rigid retention of the fuel pump in the baffle pot is avoided in order not to transmit noises arising during operation of the fuel pump to adjacent components. Rubber elements which are arranged between the first retaining means and the second retaining means have been known from practice for this purpose. The retaining means, which are manufactured from plastic, have the task of fixedly connecting the pump holder to the fuel pump and to the baffle pot. The noises arising during operation of the fuel pump are therefore exclusively damped by the rubber elements.

A disadvantage of the known device is that the rubber elements are very cost-intensive to manufacture and to fit.

EP 0 773 362 discloses a means of suspending a pump with a first and a second retaining device. The two retaining devices are connected to each other via a damping device. The damping device comprises a multiplicity of limbs, with each limb comprising two vertical arms and a radial arm. Since the force deflection takes place essentially only in a vertical direction, to provide sufficient damping a relatively large number of limbs are required.

The invention is based on the problem of configuring the device of the type mentioned at the beginning in such a manner that it is constructed as cost-effectively as possible.

SUMMARY OF THE INVENTION

This problem is solved according to the invention in that the first retaining means, the second retaining means and the damping device are manufactured as a single piece.

This configuration enables the pump holder of the device according to the invention to be manufactured as a single piece. A complicated and cost-intensive installation of the pump holder is therefore unnecessary. Furthermore, the pump holder can be manufactured in a single working step, which leads to a further reduction in the manufacturing costs of the device according to the invention.

According to an advantageous development of the invention, the damping device turns out to be particularly simple in terms of design if the damping device has arms which are angled away from one another, and if during a movement of the fuel pump the arms are subject to a torsional and/or bending load. By means of this configuration, the fuel pump is suspended in a cardanic frame. This suspension permits very high degrees of freedom for the movements of the fuel pump in every direction. The movements of the pump are damped by the arms which are angled away from one another, and are therefore kept away from the retaining means, which are to be arranged on the baffle pot or the fuel container itself.

According to another advantageous development of the invention, the damping device is further simplified if the damping device has at least one first vertical arm and at least one first horizontal arm angled away from the first vertical arm.

According to another advantageous development of the invention, the transmission of intensive vibrations of the fuel pump to adjacent components can be kept particularly low if a second vertical arm is arranged between the first horizontal arm and a second horizontal arm, which is connected to the second retaining means.

According to another advantageous development of the invention, the pump holder is highly stable if the first and/or the second horizontal arm is/are designed as an annular element.

According to another advantageous development of the invention, the connection of the pump holder to adjacent components requires a particularly low structural outlay if the first retaining means are designed such that they are supported radially on the inside of the baffle pot and such that they rest axially.

The stability of the pump holder is further increased, according to another advantageous development of the invention, if the second retaining means have a pipe length surrounding the fuel pump.

According to another advantageous development of the invention, the connection of the pump holder to the fuel pump requires a particularly low structural outlay if the second retaining means have latching hooks, arranged on the pipe length, for retaining the fuel pump.

The pump holder is capable of reliably damping noises and vibrations but, according to another advantageous development of the invention, is capable of reliably absorbing strong movements of the fuel pump if the first vertical arm has a radially inwardly pointing hook, and if the hook limits the vertical movement of the second retaining means.

In the case of intensive vibrations, the fuel pump, according to another advantageous development of the invention, is reliably kept in its designated position if an annular element connected to the first retaining means has a radially inwardly pointing supporting element situated opposite the pipe length at a designated distance. This supporting element limits the radial movement of the fuel pump.

The manufacturing costs of the device according to the invention are further reduced if the single-piece component comprising first and second retaining means and the damping device is manufactured from plastic by injection molding.

According to another advantageous development of the invention, the sealing off of the fuel pump from the baffle pot requires a particularly low structural outlay if the fuel pump has an annular, elastomeric sealing element for the annular sealing of an opening arranged in the bottom region of the baffle pot.

According to another advantageous development of the invention, transmission of noises of the fuel pump via the sealing element can be avoided in a simple manner if the sealing element has an obliquely angled sealing lip, and if the free end of the sealing lip rests on the bottom of the baffle pot.

BRIEF DESCRIPTION OF THE DRAWINGS

The invention permits numerous embodiments. To further clarify its basic principle, one of these is illustrated in the drawing and is described below. In the drawings.

DETAILED DESCRIPTION OF THE PREFERRED EMBODIMENT

Figure 1:
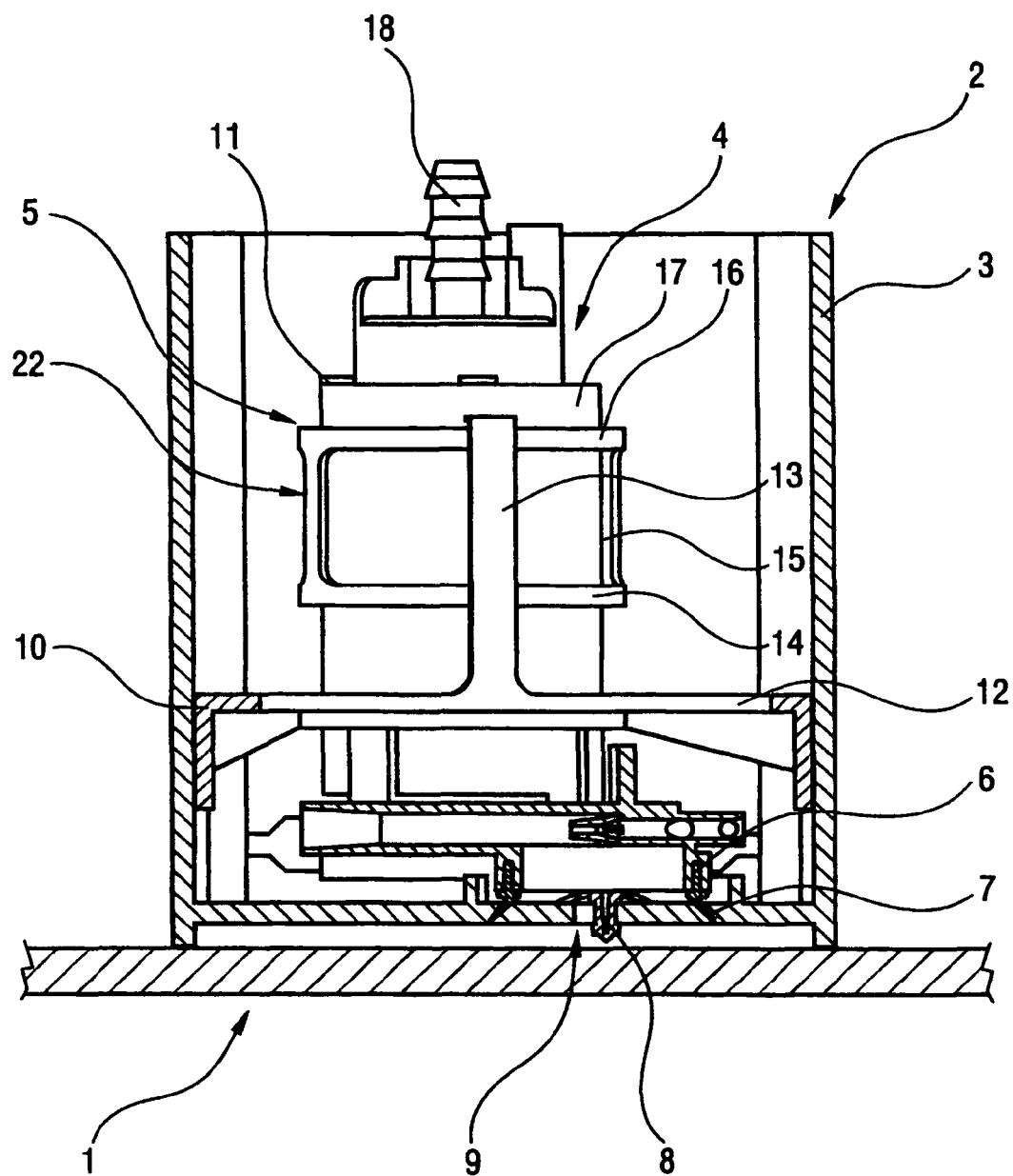
FIG. 1 shows a fuel pump retained in a fuel container by a device according to the invention.

FIG. 1 shows a sectional illustration through a feed unit 2, which is arranged in a fuel container 1 of a motor vehicle, with a fuel pump 4, which is arranged in a baffle pot 3. The fuel pump 4 is retained by a pump holder 5 supported on the baffle pot 3. Furthermore, the fuel pump 4 has a sealing element 6 which is supported by the free end of a sealing lip 7 on the bottom of the baffle pot 3 in the region of an opening 9 closed by a bottom valve 8. The pump holder 5 and the sealing element 6 together form the device for retaining the fuel pump 4 in the baffle pot 3. The pump holder 5 has first retaining means 10 supported on the baffle pot 3 and second retaining means 11 retaining the fuel pump 4. The retaining means 10, 11 are manufactured as a single piece with a damping device 22. The first retaining means 10 are connected to one another via an annular element 12 and to a first vertical arm 13. A horizontal arm 14 designed as an annular element adjoins the first vertical arm 13. The first horizontal arm 14 is connected to a second horizontal arm 16 via a second vertical arm 15. The second horizontal arm 16 is connected to a pipe length 17 surrounding the fuel pump 4. The arms 13-16 which are angled away from one another form the damping device 22. During a movement of the fuel pump 4 the arms 13-16 are subject to a bending and torsional load and therefore produce an elastic retention. Vibrations of the fuel pump 4 are likewise damped. The second retaining means 11 are arranged on the pipe length 17. To simplify the drawing, the first retaining means 10 are illustrated rotated into the plane of the paper. In actual fact, in each case three first retaining means 10 are distributed over the circumference.

The vertical and horizontal arms 13-16 form a cardanic frame which permits designated movements of the fuel pump 4. During a movement of the fuel pump 4 the arms 13-16 are subject to a torsional and bending load.

The fuel pump 4 sucks up fuel from the fuel container 1 via the bottom valve 8 and feeds it to a connector 18. A fuel line (not illustrated) leading to an internal combustion engine of the motor vehicle can be connected to the connector 18.

Figure 2:
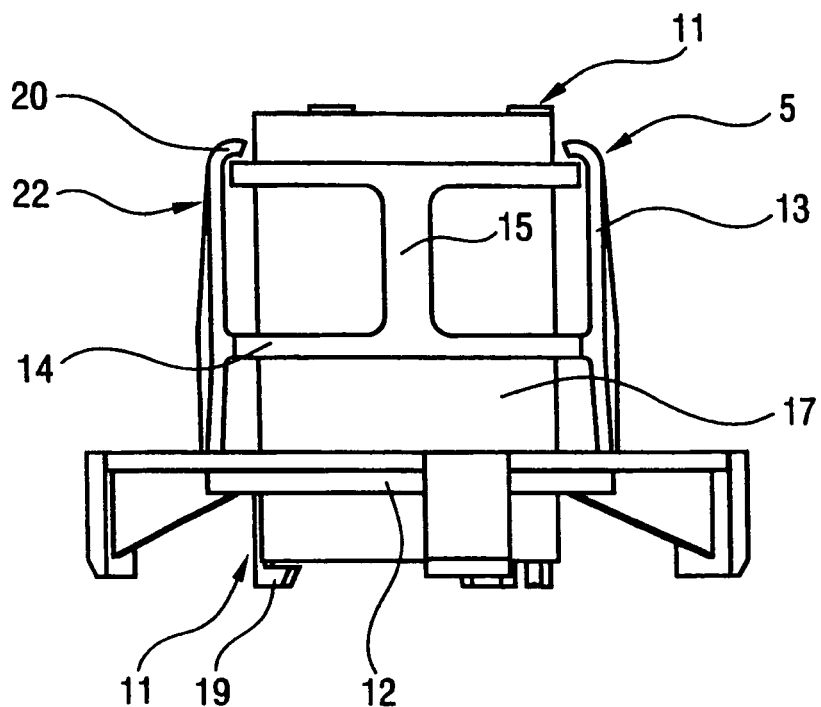
FIG. 2 shows a side view of a pump holder of the device according to the invention from FIG. 1.

FIG. 2 shows, in a side view of the pump holder 5 from FIG. 1, that the second retaining means 11 for retaining the fuel pump 4 have latching hooks 19 arranged on the pipe length 17. Furthermore, radially inwardly pointing hooks 20 are arranged on the first vertical arm 13 and limit the vertical movement of the pipe length 17 and therefore the movement of the fuel pump 4 illustrated in FIG. 1.

Figure 3:
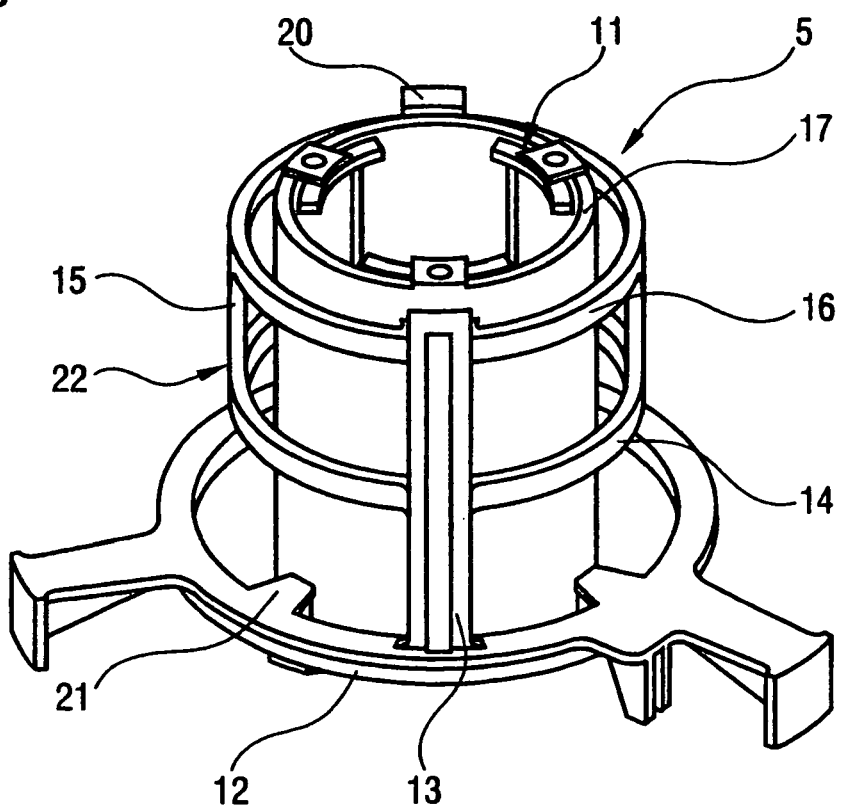
FIG. 3 shows a perspective illustration of the pump holder from FIG. 2.

FIG. 3 shows, in a perspective illustration of the pump holder 5, that the annular element 12 connecting the first retaining means 10 has radially inwardly pointing supporting elements 21. The supporting elements 21 are at a distance from the pipe length 17 and limit its freedom of movement and therefore the freedom of movement of the fuel pump 4 in the radial direction.

The invention claimed is:

1. A device for retaining a fuel pump in a fuel container of a motor vehicle, comprising a pump holder having a plurality of first and second retaining means, the first retaining means of the pump holder provided for supporting the pump holder on a baffle pot, and the second retaining means of the pump holder provided for supporting the fuel pump, and with a damping device connecting the first and the second retaining means to one another, the first retaining means, the second retaining means and the damping device being manufactured as a single piece from a plastic material, in that the damping device has arms which are angled away from each other, and in that during a movement of the fuel pump the arms are subject to at least a torsional or a bending load, wherein the arms of the damping device include an annular element connected to the first retaining means, at least one first vertical arm connected to the annular element, the at least one first vertical arm extending substantially in a vertical direction and first and second horizontal arms extending substantially horizontally and angled away from the first vertical arm, the first and second horizontal arms being spaced apart in the vertical direction, and at least one of the first and the second horizontal arms is designed as another annular element, wherein a second vertical arm connects the first horizontal arm and the second horizontal arm of the damping device, and wherein only the second horizontal arm of the arms of the damping device is directly connected to the second retaining means.

2. The device as claimed in claim 1, wherein the first retaining means are designed such that they are supported radially on the inside of the baffle pot and such that they rest axially.

3. The device as claimed in claim 1, wherein the second retaining means have a section of pipe surrounding the fuel pump.

4. The device as claimed in claim 3, wherein the second retaining means have latching hooks, arranged on the section of pipe, for retaining the fuel pump.

5. The device as claimed in claim 1, wherein the first vertical arm has a radially inwardly pointing hook, and in that the hook limits the vertical movement of the second retaining means.

6. The device as claimed in claim 3, wherein an annular element connected to the first retaining means has a radially inwardly pointing supporting element spaced apart from and opposite to the section of pipe of the second retaining means surrounding the fuel pump.

7. The device as claimed in claim 1, wherein the single-piece component comprising first and second retaining means and the damping device is manufactured from plastic by injection molding.

8. The device as claimed in claim 1, wherein the fuel pump has an annular, elastomeric sealing element for the annular sealing of an opening arranged in the bottom region of the baffle pot.

9. The device as claimed in claim 8, wherein the sealing element has an obliquely angled sealing lip, and in that the free end of the sealing lip rests on the bottom of the baffle pot.

10. The device as claimed in claim 1, wherein the first retaining means are designed such that they are supported radially on the inside of the baffle pot and such that they rest axially.

11. The device as claimed in claim 1, wherein the second retaining means have a section of pipe surrounding the fuel pump.

12. The device as claimed in claim 2, wherein the second retaining means have a section of pipe surrounding the fuel pump.

13. The device as claimed in claim 2, wherein the first vertical arm has a radially inwardly pointing hook, and in that the hook limits the vertical movement of the second retaining means.

14. The device as claimed in claim 1, wherein the single-piece component comprising first and second retaining means and the damping device is manufactured from plastic by injection molding.

15. The device as claimed in claim 1, wherein the fuel pump has an annular, elastomeric sealing element for the annular sealing of an opening arranged in the bottom region of the baffle pot.

16. The device as claimed in claim 2, wherein the single-piece component comprising first and second retaining means and the damping device is manufactured from plastic by injection molding.

17. The device as claimed in claim 2, wherein the fuel pump has an annular, elastomeric sealing element for the annular sealing of an opening arranged in the bottom region of the baffle pot.

18. The device as claimed in claim 1, wherein only the first horizontal arm of the first and second horizontal arms is connected directly to the at least one first vertical arm, and wherein only the at least one first vertical arm of the arms is directly connected to the first retaining means.

* * * * *